(12) United States Patent
Tremblay et al.

(10) Patent No.: US 7,077,065 B2
(45) Date of Patent: Jul. 18, 2006

(54) INTEGRATED BI-MODAL WHEEL ASSEMBLY

(75) Inventors: Richard B. Tremblay, 5 Keller Pl., Boise, ID (US) 83716; James D. Larkin, Boise, ID (US)

(73) Assignee: Richard B. Tremblay, Boise, ID (US)

( * ) Notice: Subject to any disclaimer, the term of this patent is extended or adjusted under 35 U.S.C. 154(b) by 300 days.

(21) Appl. No.: 10/439,707

(22) Filed: May 16, 2003

(65) Prior Publication Data

US 2004/0237831 A1 Dec. 2, 2004

(51) Int. Cl.
*B61C 11/00* (2006.01)
*B61C 23/00* (2006.01)

(52) U.S. Cl. .................. 105/72.2; 305/34; 152/415; 152/419

(58) Field of Classification Search .......... 105/215.1, 105/215.2, 72.2; 305/8, 34; 152/415, 416, 152/418, 419
See application file for complete search history.

(56) References Cited

U.S. PATENT DOCUMENTS

| | | | | |
|---|---|---|---|---|
| 1,811,551 A | * | 6/1931 | Loening | 280/47.32 |
| 1,853,572 A | | 4/1932 | Nugent | |
| 1,886,573 A | * | 11/1932 | Nelson | 105/72.2 |
| 2,027,302 A | * | 1/1936 | Hacker | 105/215.2 |
| 2,027,540 A | | 1/1936 | Lewis | |
| 2,042,265 A | * | 5/1936 | Main | 105/215.2 |
| 2,193,046 A | | 3/1940 | Strauss | |
| 2,657,947 A | * | 11/1953 | Kerner | 295/8.5 |
| 2,998,996 A | * | 9/1961 | Aghnides | 301/41.1 |
| 3,927,910 A | | 12/1975 | Fagel | |
| 3,945,326 A | | 3/1976 | Seifert | |
| 4,596,192 A | | 6/1986 | Forster | |
| 4,598,750 A | | 7/1986 | Gant | |
| 4,640,331 A | | 2/1987 | Braun | |
| 4,666,216 A | * | 5/1987 | Smith | 301/40.4 |
| 5,186,109 A | | 2/1993 | Madison | |
| 5,540,268 A | | 7/1996 | Mittal | |
| 5,544,688 A | | 8/1996 | Freigang | |
| 5,553,647 A | | 9/1996 | Jaksic | |
| 5,619,931 A | | 4/1997 | Madison | |
| 5,740,742 A | | 4/1998 | Bush | |
| 5,813,349 A | | 9/1998 | Jensen | |
| 6,012,396 A | | 1/2000 | Schultz | |
| 6,021,719 A | | 2/2000 | Kershaw | |
| 6,158,602 A | | 12/2000 | Zakula | |
| 6,199,485 B1 | | 3/2001 | Pyle | |

* cited by examiner

*Primary Examiner*—Mark T. Le

(57) ABSTRACT

This invention relates generally to vehicular transportation for humans and freight by roadway and railway. More specifically, this invention relates to a unique combination of a novel roadway wheel and pneumatic tire assembly, incorporating a known automatic inflate-deflate system and a novel lightweight railway wheel; both wheels then coupled and concentrically assembled on a common axle with special provisions for the known automatic inflation and deflation of the pneumatic roadway tire.

1 Claim, 4 Drawing Sheets

INTEGRATED BI-MODAL WHEEL ASSEMBLY

BACKGROUND DESCRIPTION OF THE INVENTION

1. Field of the Invention

This Integrated Bi-modal Wheel Assembly (IBMWA), invention relates generally to freight transport and mass transport of humans by roadway and railway. The transport of humans and freight on railways is a well established form of surface transportation, and is performed by a broad set of railway vehicles that are engineered, designed and manufactured to operate exclusively on steel railway tracks—the most common being the Standard Gauge (56.5 in. between inside rail flanges) parallel steel railway infrastructure common throughout North America. The transport of humans and freight on roadways is also a well established form of surface transportation, and is performed by a variety of roadway vehicles that are engineered, designed and manufactured to operate exclusively on many classes of improved roadways.

More specifically, this invention relates to integrated assemblies of custom roadway wheels and custom lightweight railway wheels. This unique combination of custom roadway wheels and pneumatic tire assemblies, when integrated with custom lightweight railway wheels; are both coupled and concentrically assembled on a common axle with special provisions for the automatic inflation and deflation of the roadway pneumatic tire. In addition to freight and mass transit systems, other applications for use include dual (civilian—military) use and other single-purpose transport systems (e.g., ordnance, bio, chemical, nuclear, mixed or hazardous waste).

There exists throughout the transportation industry several different adaptive apparatuses that are designed to convert roadway vehicles so they may be placed onto railways and transport in a railway mode. Conversely, there exists, to a lesser extent, different adaptive apparatuses that are designed to convert railway vehicles so they may be placed onto roadways and transport in a roadway mode. These existing apparatuses are operational throughout the transportation industry and are all independent assemblies and mechanisms that are attached to primary vehicles as auxiliary devices.

All of these referenced devices are relatively complex and bulky, and function by moving or extending an auxiliary set of wheels to engage and facilitate one particular mode of transport, or to retract to an inoperative or stored position thereby allowing the vehicle to transition back to its primary mode of transport.

The existing auxiliary apparatuses all function on a set of axles and wheels that are separate and independent from the vehicles primary set wheels and axles, and in many designs, the auxiliary wheels are significantly smaller in diameter than the vehicles primary wheels. The smaller wheels have the disadvantage of substantially slowing and diminishing the vehicle's ability to transport at regulated speed limits.

Many of the existing auxiliary apparatuses also require modifications and/or provisions to railway and roadway infrastructures for supporting a vehicle's transition and alignment to and from the railway and roadway transport modes. These existing auxiliary apparatuses while stored in a retracted and non-functioning position on a vehicle while operating in a roadway transport mode are particularly cumbersome and reduce the vehicles maneuverability and driveability.

2. Related Art

For many years specially constructed devices have been designed, patented and used to adapt road vehicles for use on railroad tracks. It is not uncommon to see a standard pickup truck making its way along a railroad track under its own power. Generally such adaptations are made to support railroad service and maintenance operations. Typically, the road vehicle is driven in a conventional fashion to the selected point at which it is to begin using the railroad track. After positioning the road vehicle over the rails, the rail engagement apparatus is actuated such that the rail wheels are lowered from the vehicle to the track. This process may simultaneously raise the vehicle's front road wheels to eliminate their contact of the road wheels with both the rails and the track bed. Alternatively the front road wheels are raised in a separate mechanical operation. The rear road wheels usually remain in contact with the rails or the track bed to provide the needed propulsion. When the road vehicle is to be returned to normal road usage, the process described above is reversed.

As in the above description, all of the known designs incorporate separate road wheel and rail wheel pairs which may be raised or lowered depending on the desired transport mode, (i.e., road or rail). Some of these designs incorporate the mechanism for raising and lowering the road-rail wheels in the basic design of thew vehicle. Others provide a separate wheel assembly or "bogie" which mates with the chassis of the vehicle to adapt it to the alternate transport mode. A few of the known and relevant examples representative of the above approaches are presented in the following:

Madison (U.S. Pat. No. 5,186,109) teaches an adaptation device having railroad wheels that attach to a frame of a road vehicle. This device has a side shift capability whereby the railroad wheels may be lowered to engage the rails when the road vehicle is offset sideways and parallel to the tracks. An automatic system centers the vehicle over the tracks after the rail wheels have engaged the rails. A spring arrangement is also provided to maintain the rail wheels in contact with the rails. In two subsequent patents, (U.S. Pat. No. 5,619,931) and (U.S. Pat. No. 5,868,078), Madison provides truck tractor vehicle frames for adaptation for rail use. These frames also enable the tractor to be used on a roadway. Each patent incorporates a front guide rail wheel unit and a rear road wheel drive unit. When the front unit is lowered the rail wheels engage the truck's rails. When the front unit is raised, separately mounted road wheels engage the roadway. When the rear unit is lowered its road wheels are in contact with the roadway. Raising the rear unit allows a separately mounted rear rail wheel bogey to engage the rails.

Bush (U.S. Pat. No. 5,740,742) has adapted a truck tractor for use on railways to tow one or more railcars while retaining the capability to tow highway trailers. Bush provides a set of hydraulically retractable railway wheels to guide the rear drive wheels while on the rails. The front of the tractor is equipped with a set of retractable railway wheels that are used to lift the front steering axle of the truck tractor clear of the railroad rails.

Kershaw (U.S. Pat. No. 6,021,719) has invented a self-propelled track vehicle capable of traveling at highway speeds and traveling by rail. This is accomplished by providing separate sets of road and rail wheels, all of which may be selectively raised and lowered to enable the desired operating mode. Kershaw also provides a turntable device attached to the vehicle's chassis so that it may be rotated 90 degrees for placement on the railway track.

Pyle (U.S. Pat. No. 6,199,485) provides a rail conversion module for a tractor that allows the tractor to be driven either on the ground or on the railroad tracks. He provides a hinged frame module that fits under the tractor with front rail wheels and driven rear rail wheels. Both wheel sets may be raised for ground travel or lowered for rail travel.

Nugent (U.S. Pat. No. 1,853,572) has invented a combination railway wheel, and roadway pneumatic tire and wheel that incorrectly assumes a pneumatic tire with metallic structural reinforcing changes diameter as a function of increases or decreases in tire pressure. This patent does not provide for the automatic inflation and deflation of the pneumatic tire and does not position the pneumatic tire adjacent to and in contact with the railway wheel to provide for assisting wheel alignment with the steel track while operating in the railway transport mode.

Strauss (U.S. Pat. No. 2,193,046) has an automotive train invention that principally addresses a centrally located motor-generator truck assembly and the distribution of motive power there from. The invention features transit cars that ride on, and are supported on pneumatic tires.

The weight-bearing pneumatic tires are intended to ride on a roadway surface that is adjacent to and at the same level as a set of rail tracks. The invention includes a retractable set of small diameter rail wheels on separate axles that provide for aligning and steering the vehicle on the railway, but with no capacity for carrying the vehicle's load.

Zakula, Van Gorp (U.S. Pat. No. 6,158,602) has adapted large mobile gantry cranes to increase the cranes load-carrying capacity by the addition of special railway wheels adjacent to and concentric with the crane's standard roadway tires and wheels. The additional railway wheels are configured with double flanges and are designed to function exclusively on short sections of straight track that are installed onto, and therefore elevated above the roadway surface. These surface-mounted tracks are typically installed in heavy industrial shipyards and freight handling terminals. This invention has no intention or purpose for inflating or deflating the gantry crane tires, but merely applies the special railway wheels to increase the crane's load carrying capacity and avoid the potential for overloading and crushing the pneumatic tires.

Forster (U.S. Pat. No. 4,596,192) has adapted a system for passenger transportation using a vehicle of various configurations based on a system of building blocks. The vehicles are to be assembled for roadway transportation only, railway transportation only, or with the provisions for both roadway and railway transportation by the same vehicle. All vehicles of the invention are to be equipped with pneumatic tires on horizontal axles to carry the total vertical weight and load the vehicle. The vehicles of the Forster invention intended for railway transportation are additionally equipped with sets of small diameter pneumatic wheels that rotate about a vertical axis and function to ride on vertical curb-walls of a special infrastructure and to carry the lateral loads of a railcab when the vehicle is executing turns or curves. The invention refers to these curb-walls as rails, but they are not remotely similar to the steel flange rails common to the North American rail transportation infrastructure. The special curb-wall infrastructures of the invention are presently installed in a very few international urban metropolitan areas and have thus far proven very costly to construct and maintain. The invention, other than falling in the broad realm of transportation systems, is not related in any way, shape of form to the Integrated Bi-Modal Wheel Assembly invention of this patent application.

Pollitt (U.S. Pat. No. GB2280644A) has invented a vehicle for carrying freight or passengers and is adaptable for travel on roadways, railways and waterways. The invention primarily addresses the broad scope of a system and means for transporting passengers and freight on roadways, railways and waterways with no specific definition on how the various subsystems and components of the vehicle will function structurally, mechanically, electrically or dynamically. The invention drawings indicate the closely coupled assembly of a roadway wheel and a railway wheel which is not described in the text of claims. The railcab invention addresses an "alternative support medium or media" required for the railcab to be lifted onto or off of the railway. The railcab invention addresses "wheels of very elastic material" that, paradoxically, suggests the capability of supporting the railcab such that the rail wheels are raised free and clear of the roadway surface, and yet will compress sufficiently to lower the railway wheels to contact and rest on the railway tracks. The invention does not address any provision for a way or means whatsoever for the "wheels of very elastic material" to be pneumatically inflated or deflated to provide for the physical raising or lowering of the railcab, which without such provision, the stated function of modal convertibility is physically impossible.

None of the patents cited above either address or provide apparatuses in the form of the Integrated Bi-modal Wheel Assembly of this invention, and that is designed to enable vehicles equipped with said Integrated Bi-modal Wheel Assemblies to physically transition to and from the railway transport modes and the roadway transport modes without changes in vehicles configuration, and without requiring any changes or modifications to existing North American railway and roadway infrastructures.

As can be readily concluded from the above discussion, this wide assortment of conversion and adaptation devices are complicated by their need to incorporate raising and lowering mechanisms or to provide a separate undercarriage to allow for the second transportation mode. This complexity adds fabrication costs, increases vehicle weight and maintenance, reduces reliability and may adversely impact operational safety. Such systems are also complex to operate, particularly when making roadway-railway transitions.

With the advent of freight and mass transit systems incorporating road-rail adaptive vehicles, a critical need exists for new methods for reliably and efficiently transitioning from a roadway or railway transportation mode to the other mode. To provide a seamless transition, the vehicle must be liberated from the cumbersome and complex equipment and processes as taught in the prior art.

Thus it is a primary objective of this invention to provide wheel assemblies for road-rail vehicles that will efficiently, effectively and safely function on either a roadway or a rail way. It is a further objective of this invention that this assembly may not require any actuation mechanisms to accomplish the roadway/railway transition. It is yet a further objective of this invention that the roadway/railway transition may be accomplished automatically without operator intervention. It is a final objective of this invention to provide a wheel assembly that is lightweight yet structurally sound for the intended dual use, roadway/railway application.

SUMMARY OF THE INVENTION

The objective of the invention is to provide a new and improved apparatus set that, when applied to a wide variety of transit and freight vehicles, and through simple maneuvering by the vehicle operator, will quickly and efficiently transition said vehicles from a road-way transport mode to a railway transport mode, and conversely, from a railway transport mode to roadway transport mode without any requirement to change vehicle configuration. The apparatus set is a combination of a railway wheel, and a roadway wheel and pneumatic tire assembly mounted concentrically and closely coupled on a single hub, spindle and axle assembly.

The railway wheel is a lightweight design and made of steel. The railway wheel's outside face is uniquely shaped to couple to and rest against the inside face of the pneumatic tire. The railway wheel tread is shaped with a 20 degree slope (taper) that is standard to the North-American rail transportation industry. The railway wheel is configured with a shallow flange on the inside edge of the wheel and at the extremity of the wheel's diameter to assure correct wheel-to-track engagement and alignment while operating in the railway transport mode.

The roadway wheel is a heavy industrial truck design of appropriate structural integrity and sizing to adapt and carry a pneumatic tire of matching size and proper load range. The roadway wheel will be specially machined and ported to provide for the embedment of components for an automatic tire inflation and deflation system.

The mounting flange of the roadway wheel will be sufficiently offset to allow the inside flange face of the roadway wheel to contact and mount against the outside flange face of the railway wheel. The railway wheel and the roadway wheel are concentrically mounted on and secured to a common hub by an appropriate strength, size and quantity of hub studs and screw-nuts.

The pneumatic tire component of the roadway wheel and pneumatic tire assembly will be mounted such that the tire's inside face and sidewall will be in contact and rest against the contoured outside face of the railway wheel. The pneumatic tire is approximately three (3) inches greater in diameter that the diameter of the railway wheel. Therefore, the inside face and sidewall of the pneumatic tire near the extremity of tire's diameter is uniquely positioned to slightly contact the outside edge of the railway track flange, and to thereby effectively provide added stability to the wheel-to-track engagement and alignment while operating in the railway transport mode.

Because the pneumatic tire will share the function of assuring wheel-to-track engagement and alignment while operating in the railway transport mode by lightly riding against the outside edge of the railway track, the pneumatic tire component of the apparatus set must be manufactured with a unique and robust tread and wear band at the inside sidewall area of the tire where the tire will contact the outside edge of the railway track.

The hub and spindle assembly that carries the apparatus set is machined and ported to provide for the embedment of compressed air passages, glands, seals, and other features for the adaptation of a commercially available automatic tire inflation and deflation system. The function of the automatic tire inflation and deflation system is to provide for the rapid inflation of the pneumatic tire for operating in the roadway transport mode, and raising and holding the railway wheel free and clear of the paved roadway surfaces. Conversely, the automatic tire inflation and deflation system will provide for the rapid deflation of the pneumatic tire for operating in the railway transport mode and lowering and keeping the railway wheel engaged and in full contact with the railway track.

DETAILED DESCRIPTION OF THE INVENTION

Referring to FIG. 1 through FIG. 7, this invention is for an Integrated Bi-modal Wheel Assembly for use with road-rail adaptive vehicles. Such vehicles are to be used with freight and mass transit systems. The invention is also applicable in other dual use systems (civilian and military), for transporting troops, ordinance, and/or material to unknown, unpredictable destinations, via road and rail, to simplify logistics, reduce costs, schedules, time-to-destinations, and other efficiencies. The concept can also include exclusive custom/luxury transit vehicles, as well as a mass market SUV and other vehicles designed for transport of people or freight via rail, paved roads or rustic roads.

Figure 1:
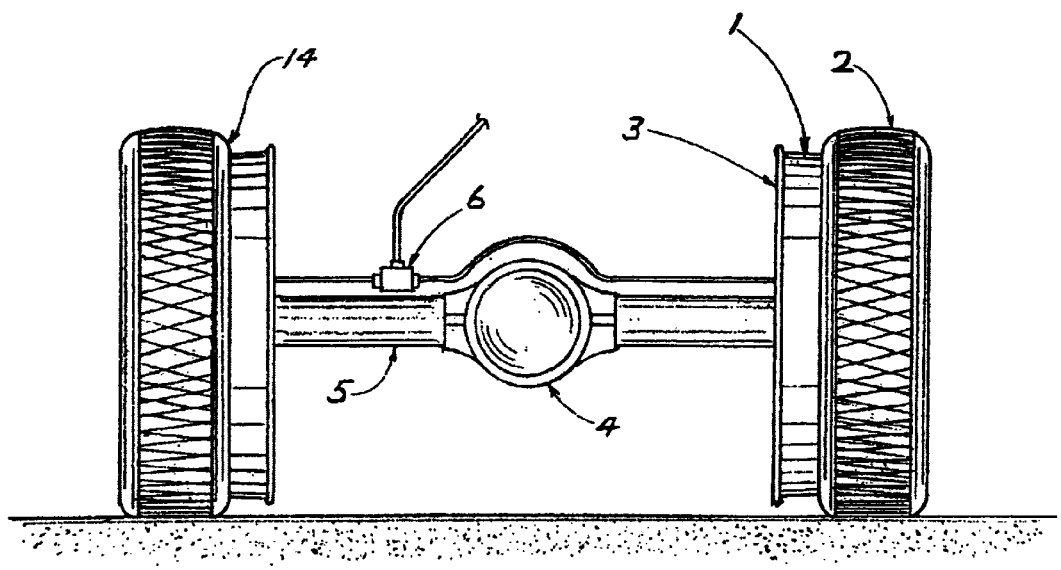
FIG. 1 shows a front view of the Integrated Bi-modal Wheel Assembly (IBMWA), in a roadway transport mode.
Figure 2:
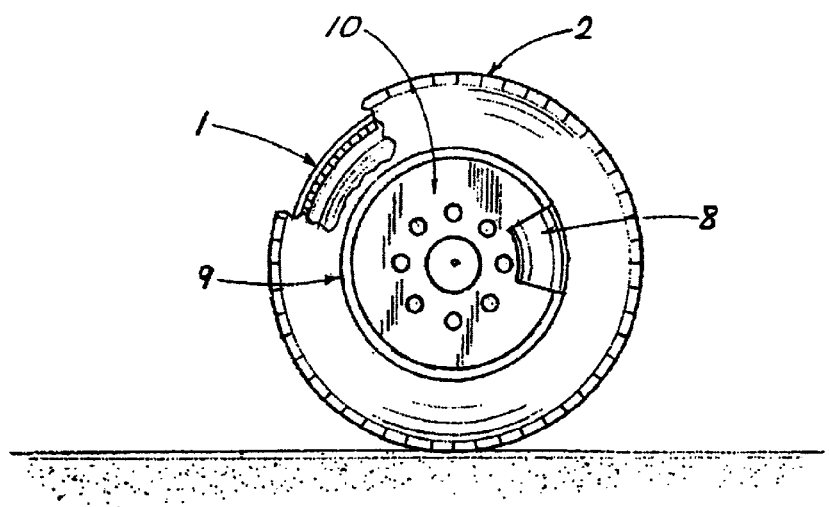
FIG. 2 shows a side view of the IBMWA in a roadway transport mode.

In the preferred embodiment of this invention, FIG. 1 comprises a pair of integrated road-rail wheels 1 & 2, each integrated wheel having road tire 2, rail wheel 1, and in FIG. 2, wheel cover 8 for known automatic inflate/deflate system valves and porting, steel roadway wheel 9, and spindle hub and lug nut area 10. In addition, FIG. 1 shows the roadway tire that has a tread area 2, the steel railway wheel has a tread area 1, a reinforced alignment flange sidewall area 14, and a steel railway alignment flange area 3. The disk portion of the steel railway wheel may be reinforced with radial stiffener sections (not shown). The two road-rail wheels have a spaced apart relationship with respect to each other and are operatively inter-connected by axle 5. The axle is fitted with a known differential and steering system 4. The assembly may also be fitted with known tie rods, king pins and the like.

Figure 3:
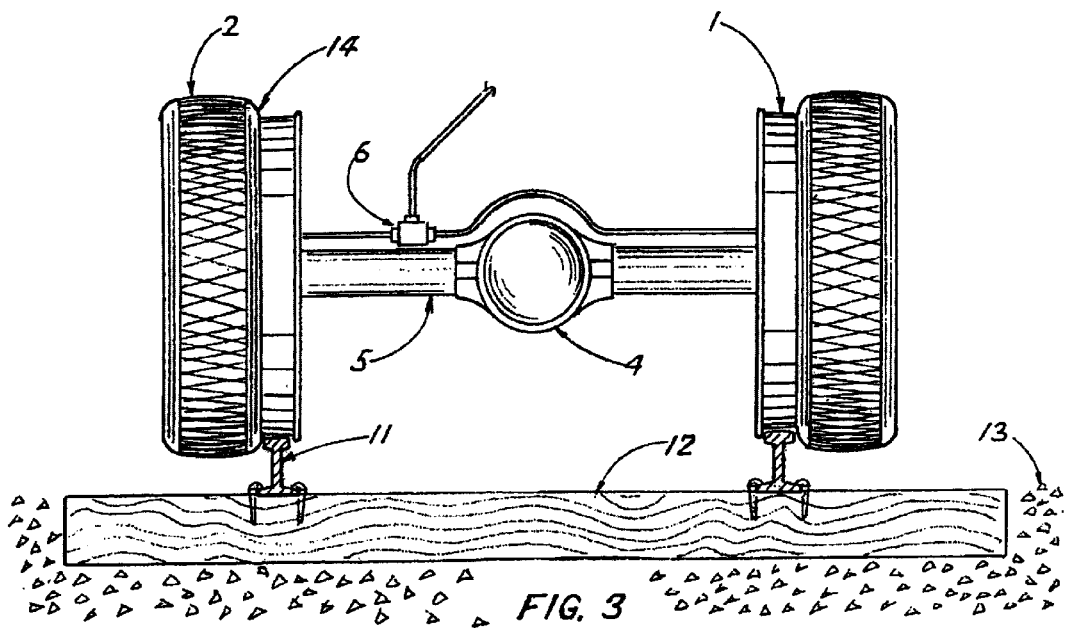
FIG. 3 shows a front view of the IBMWA in a railway transport mode.
Figure 4:
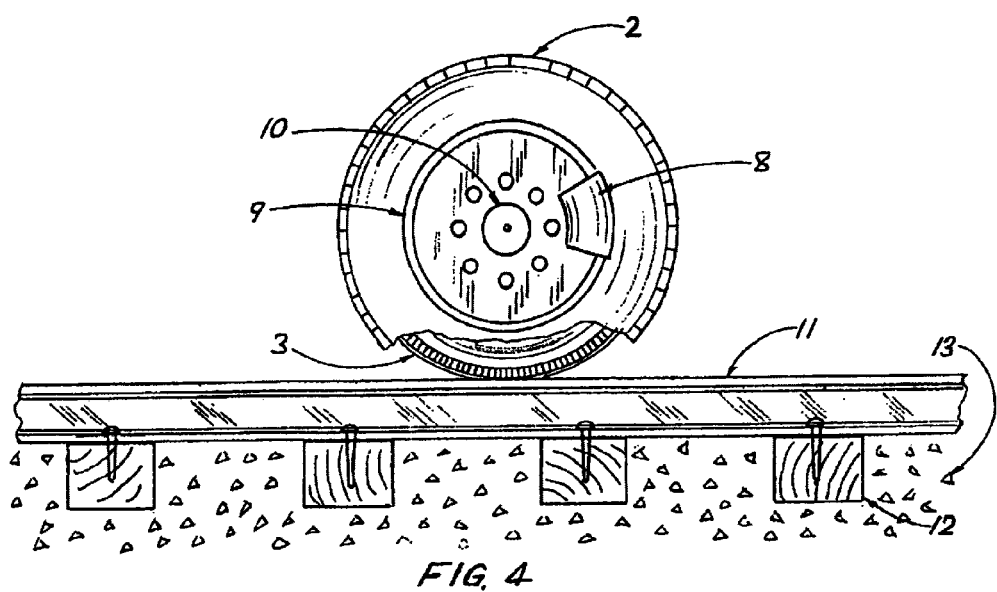
FIG. 4 shows a side view of the IBMWA in a railway transport mode.
Figure 7:
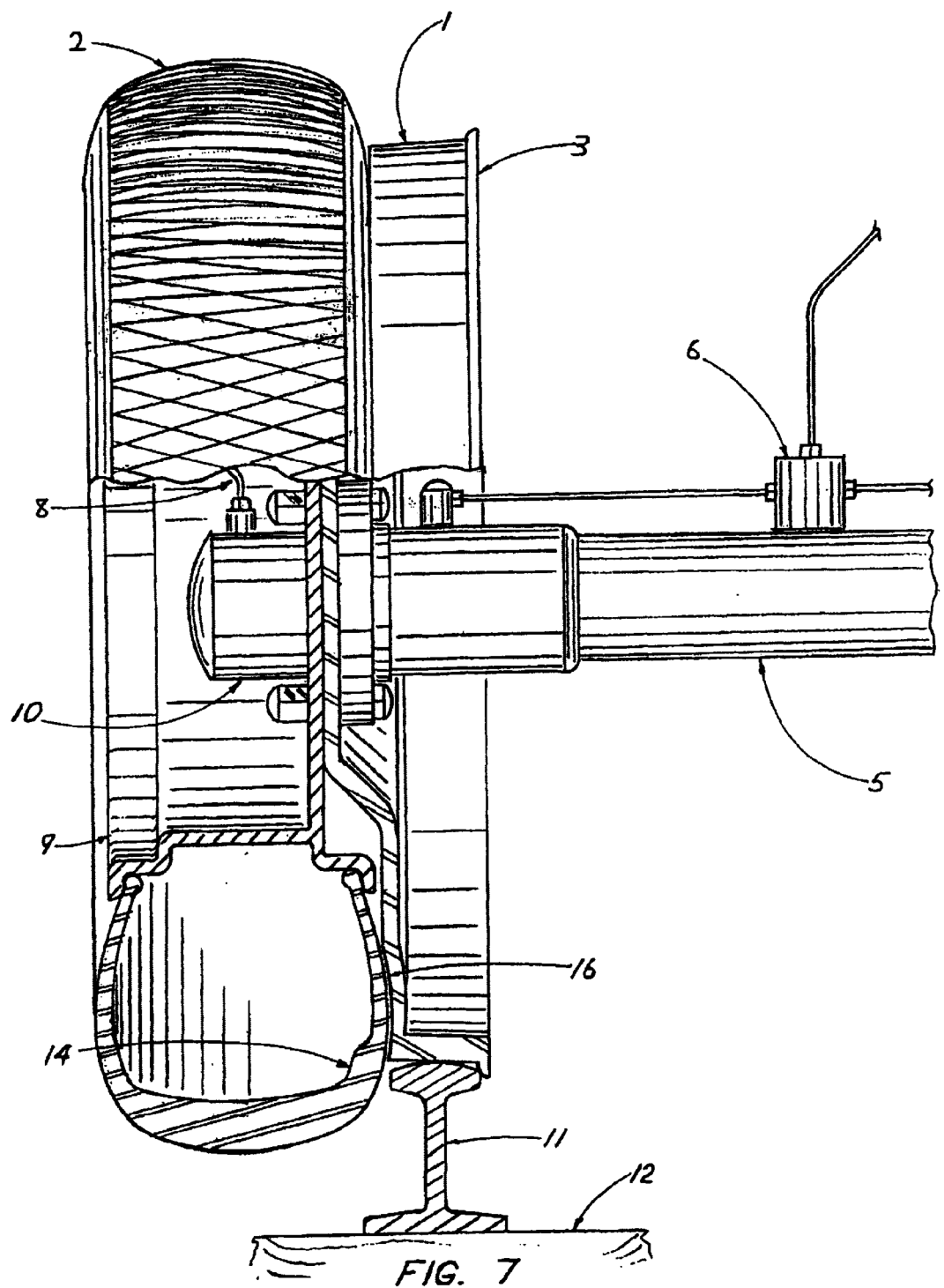
FIG. 7 provides additional clarity by illustrating a detailed cross-section of the IBMWA as installed on a typical vehicle axle assembly.

Continuing reference to FIGS. 1 and 2, road tire 2 is conventionally mounted on road wheel 9. Alignment flange 3 serves as the rail alignment flanging device such as incorporated in the design of a conventional railroad wheel. As such, the alignment flange assures the full stability and integrity of the vehicle while it operates in the railway mode, particularly during curved portions of the track. To properly accomplish this function, the inner reinforced alignment flange sidewall area 14 must be reinforced and fully abutted against the disk portion of the steel rail wheel at contour 16 as shown in FIG. 7. As shown in FIGS. 1 and 3, it is essential that the alignment flange sidewall area 14 of the fully inflated tire extend outwardly and beyond the tread section of the rail wheel. The length of the axle is designed and manufactured to accommodate the particular gauge of the railway for the route being used by the vehicle. These gauges are most commonly known as the Standard Gauge, Narrow Gauge, and Wide Gauge.

The preferred embodiment of this invention further includes means for known automatic inflation and deflation 6 of the roadway tires that is enabled while the vehicle operates on rails. When the wheel assembly is used on a roadway, it is inflated, and when it is on a railway, it is deflated. This means senses the absence of a cross-road, and rapidly deflates the roadway tire so that the vehicle remains fully supported on the rails by the steel railway wheel tread area 1. In a like fashion, when over the cross-road, and the cross-road is sensed, the roadway tire is quickly re-inflated to again operate with the roadway tire 14.

FIG. 1 shows this invention in operation on a conventional roadway surface 7. In this transport mode, the fully inflated roadway tire tread area 2 extends past the perimeter of steel railway wheel tread area 1, thereby fully supporting the vehicle on the roadway. FIG. 3 depicts this invention operating on standard railway rails 11. In this railway transportation mode, the steel railway wheel tread area 1 rides on the top of rail 11, thereby raising the road tire above the surface of the oak railway ties 12 and sub-base ballast 13. It is important to note that for this standard railway mode, the road tire may remain fully inflated, thus providing additional operational safety by maintaining the proper and effective alignment of the vehicle on the rail 11 with the assistance of the rail alignment flange function of the roadway tire 14.

The effects of the known operation of the means for automatic inflation and deflation is illustrated in FIGS. 1, 3, 5 and 6. FIG. 1 shows a fully inflated roadway tire 2 operating on a roadway surface 7. FIG. 3 shows a fully inflated roadway tire 2 operating on a steel railway track rails 11.

Figure 5:
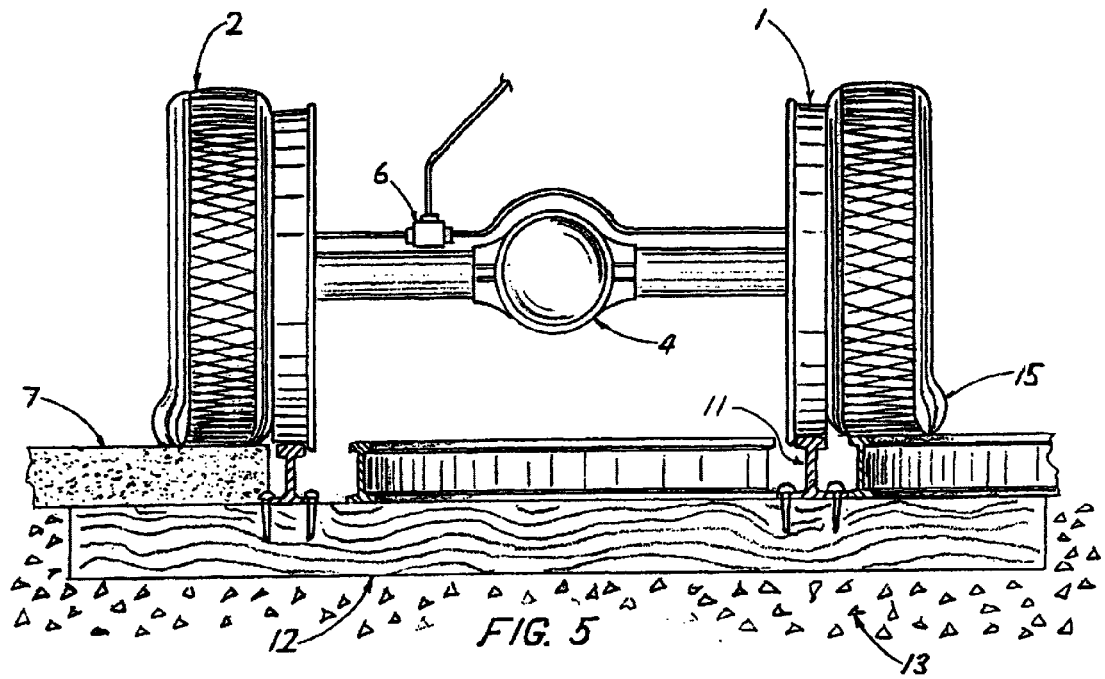
FIG. 5 shows a front or rear view of the IBMWA in a railway transport mode over a roadway crossing.
Figure 6:
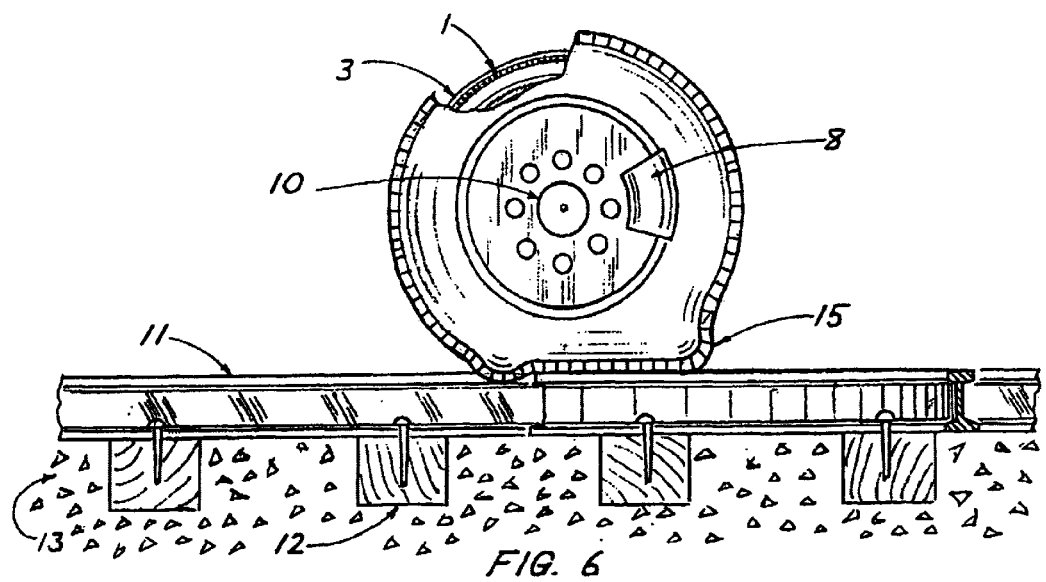
FIG. 6 shows a side view of the IBMWA in a railway transport mode over a road way crossing.

FIG. 5 shows a front (or rear), view of a deflated roadway tire 15 in railway transport mode in operation over a cross-road 7 after the roadway tire has been automatically deflated immediately subsequent to detection of a change in the rail bed, e.g. cross-road 7. FIG. 6 shows a side view of a deflated roadway tire 15 in railway transport mode in operation over a cross-road 7. The deflation of the roadway tire is indicated by the bulging profile of the sidewall 15.

It is important to note that under both the fully inflated and deflated conditions, the reinforced alignment flange sidewall tread on the pneumatic roadway tire 14 remains in full contact with the steel railway track rails 11, thus assuring the proper and effective alignment and continued safety of the vehicle on the rails.

Materials used in the manufacture of this invention are conventional other than the reinforced alignment flange sidewall tread of the pneumatic roadway tire 14, which must be formed from a rigid composition of hard/composite material bonded to the pneumatic roadway tire casing.

Although this invention has been described above with reference to particular means, materials and embodiments, it is understood that the invention is not limited to these disclosed particulars, but extends to all equivalents within the scope of the following claim.

We claim:

1. An integrated bi-modal wheel assembly for roadway and railway travels, comprising: a steel railway wheel including a disk portion and a rail tread portion, and an alignment wheel flange area formed on the disk portion of the steel railway wheel; a roadway tire including a tread portion, and a reinforced inner sidewall that is abutted against an outside surface of the alignment wheel flange area, the inner sidewall of the roadway tire extending laterally outwardly beyond the rail tread portion of the steel railway wheel; and control means on the wheel assembly for sensing the presence of a roadway or a railway so as to correspondingly and automatically inflate or deflate the roadway tire to set the wheel assembly in a proper roadway or railway operating mode, wherein, the contour of the alignment wheel flange area is configured to complement the shape of the abutting inner sidewall of the roadway tire.

* * * * *